(12) United States Patent
Masuno et al.

(10) Patent No.: US 6,456,777 B1
(45) Date of Patent: Sep. 24, 2002

(54) INFORMATION PROCESSOR, INFORMATION PROCESSING METHOD AND INFORMATION RECORDING MEDIUM ON WHICH INFORMATION PROCESSING METHOD IS RECORDED

(75) Inventors: Takashi Masuno; Hiroshi Fujioka; Hideyuki Ohgose; Tokikazu Matsumoto, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/269,834

(22) PCT Filed: Sep. 29, 1997

(86) PCT No.: PCT/JP97/03462

§ 371 (c)(1),
(2), (4) Date: Apr. 27, 1999

(87) PCT Pub. No.: WO98/14942

PCT Pub. Date: Apr. 9, 1998

(30) Foreign Application Priority Data

Oct. 1, 1996 (JP) .............................................. 8-260406

(51) Int. Cl.⁷ .......................... A04N 7/00; G11B 27/00; H04N 5/93
(52) U.S. Cl. .............................. 386/46; 386/52; 386/55
(58) Field of Search ............................. 386/46, 52, 55, 386/1, 4, 45, 6, 68, 69, 95, 125; 345/723; H04N 7/00, 5/93; G11B 27/00

(56) References Cited

U.S. PATENT DOCUMENTS 5,568,275 A * 10/1996 Norton et al.
6,389,221 B1 * 5/2002 Saeki et al.

FOREIGN PATENT DOCUMENTS

JP           7-334939           12/1995

OTHER PUBLICATIONS

"Internet User Apr. issue, 1996", vol. 2, No. 4, (No. 15 throughout), Softbank, Corp., p. 162 and Annexed CD–ROM, Apr. 1, 1996 (with partial English translation).
International Search Report corresponding to application No. PCT/JP97/03462 dated Nov. 5, 1997.

* cited by examiner

Primary Examiner—Robert Chevalier
(74) Attorney, Agent, or Firm—RatnerPrestia (57) ABSTRACT

In addition to image information recorded in a disc, "n" pcs. of selection lists which have their own proper numbers are recorded on the disc. Also, an address list of information stored outside of the disc is recorded on the disc. Each selection list has addresses of inside information of the image information recorded on the disc, one or more selection numbers, and their corresponding selection lists. The address list has selection list identification numbers and addresses corresponding to the selection list identification numbers. During the regular playback operation—playing back the image information recorded on the disc—when a user gives an instruction of selecting outside information, the user can get the address of the outside information from the now used selection list by retrieving the address list.

6 Claims, 5 Drawing Sheets

| 1 | //www.mei.co.jp/avcl/mm7/sub1/ |
|---|---|
| 2 | //www.mei.co.jp/avcl/mm7/sub2/ |
| 3 | //www.mei.co.jp/avcl/mm7/sub3/ |
| n | //www.mei.co.jp/avcl/mm7/subn/ |

INFORMATION PROCESSOR, INFORMATION PROCESSING METHOD AND INFORMATION RECORDING MEDIUM ON WHICH INFORMATION PROCESSING METHOD IS RECORDED

This Application is a U.S. National Phase Application of PCT International Application PCT/JP97/03462.

The present invention relates to an information processing apparatus which processes an image by selecting image information hierarchically stored inside as well as selects information available outside of the apparatus upon request, such an information process method, and a medium recorded such process method.

BACKGROUND OF THE INVENTION

A Video-CD is one form of information recorded media, and the disc thereof as well as the playback apparatus thereof has been commercialized. The first published standard of the Video-CD was Video-CD Version 1.1, which only specified how to playback moving images and so on. Video-CD Version 2.0, a new standard, was published with enhanced functions which allow a user to interleave stored still images and moving images arbitrarily so that the user can edit the order of playing back stored information as well as select thereof. Such playback control functions provide the user with greater convenience.

The technical terms and playback control system described in this specification are cited from the Video-CD Version 2.0 Standard.

The conventional video-CD as an information recording medium can be used only for playback purposes, therefore, it cannot meet a requirement such as updating the stored information even partially. According to Video-CD Version 2.0 Standard, a playback control simply within a disc is considered, thus selecting means for outside information is not provided.

The present invention aims to provide an information processing apparatus which allows a user to select information stored outside of the disc, an information process method of the same, and a medium recorded by the same method, while maintaining the compatibility with a conventional information recorded medium such as a video-CD.

SUMMARY OF THE INVENTION

An information processing apparatus of the present invention comprises (a) playback means having inside image information, (b) "n" pcs. of selection lists having their own proper numbers, and (c) an address list of outside information other than the inside image information. The selection list comprises the following items:

(1) An address of inside information
(2) One or more selection numbers, and
(3) Selection list identification numbers corresponding to the selection numbers.

The address list of outside information comprises the following items:

(4) Each proper number of the "n" pcs. selection lists,
(5) One or more addresses of outside information corresponding to each proper number.

An information processing apparatus of the present invention comprises (d) playback means having inside image information, (e) "n" pcs. of selection lists having their own proper numbers, and (f) "n" pcs. of address files of outside information other than the inside image information. Each of the "n" pcs. selection list comprises the following items:

(1) An address of inside information
(2) One or more selection numbers, and
(3) Selection list identification numbers corresponding to the selection numbers.

Each address file of the outside information comprises the following items:

(4) Each proper number (file name) of the "n" pcs. selection lists,
(5) One or more addresses of outside information corresponding to the selection list ID numbers.

Through one of the above structures, during the playback operation of inside image information, the present invention allows a user to search an address list of outside information, or for an address file of outside information based on the now used selection list upon request for outside information, and then move on to the process of the selection to outside based on the corresponding address.

An information process method comprises the following steps:

(a) Using an information recorded medium, get a selection list based on the initial selection list ID number, where the information recorded medium is recorded image information and comprises the following items:
  1. A field recorded "n" pcs. selection lists having their own proper selection list ID numbers, and
  2. A field recorded address lists of the information storing outside of the medium.

The selection lists comprises (1-1) An address of inside information of the image information recorded in the medium, (1-2) One or more selection numbers, and (1-3) Selection list identification numbers corresponding to the selection numbers.

The address lists comprises (2-1) Selection list identification numbers of the "n" pcs. of selection lists, (2-2) One or more addresses of outside information other than the information stored inside of the medium.

(b) Playback an image based on the address of inside information recorded in the selection list.
(c) Further select a number from the played back image.
(d) Select outside information upon request.
(e) Playback the image based on the address of inside information recorded in the selection list which was selected on Step (c).
(f) When the outside information is selected, get one or more addresses of the information stored outside of the medium, the addresses correspond to the selection list number now used.

An information process method of the present invention comprises the following steps:

(A) Using an information recorded medium, get a selection list ID number based on the initial selection list identification number, where the information recorded medium is recorded image information and comprises the following items:
  1. A field recorded "n" pcs. selection lists having their own proper selection list ID numbers, and
  2. "n" pcs. of address files of the information stored outside of the medium.

The selection lists comprises (1-1) An address of inside information of the image information recorded in the medium, (1-2) One or more selection numbers, and (1-3) Selection List ID numbers corresponding to the selection numbers.

The "n" pcs. of files comprises (2-1) the corresponded each selection list ID number, (2-2) One or more addresses of the information stored outside of the medium, the addresses correspond to the selection list identification numbers.

(B) Playback an image based on the address of inside information recorded in the selection list.

(C) Further select a number from the played back image.

(D) Select outside information upon request.

(E) Playback the image based on the address of inside information recorded in the selection list which was selected on Step (C).

(F) When the outside information is selected, get one or more addresses of the information stored outside of the medium, the addresses correspond to the address lists of "n" pcs. address files.

Through one of the above methods, the present invention allows a user to get an initial selection list identification number and get the first selection list, then playback an image based on an address of inside information stored in the selection list. When a selection number is selected based on the first image, the image with the address of inside information stored in the-selection list selected by the first selection is played back. In this operation, if an instruction is given to select the information stored outside of the medium, a user can select the selection number to search for an address list or an address file of the outside information.

An information recording medium of the present invention on which is recorded image information, and comprises the following items:

1. A field recorded "n" pcs. selection lists having their own proper selection list ID numbers, and
2. A field recorded address lists of the outside information.

The selection lists comprises (1-1) An address of inside information of the image. information recorded in the medium, (1-2) One or more selection numbers, and (1-3) Selection list identification numbers corresponding to the selection numbers.

The address list comprises (2-1) Selection list identification numbers of the "n" pcs. of selection lists, (2-2) One or more addresses of outside information other than the information stored inside of the medium.

An information recorded medium of the present information is recorded image information, and comprises the following items:

1. A field recorded "n" pcs. selection lists having their own proper selection list identification numbers, and
2. "n" pcs. of address files of the information stored outside of the medium.

The selection lists comprises (1-1) An address of inside information of the image information recorded in the medium, (1-2) One or more selection numbers, and (1-3) Selection list identification numbers corresponding to the selection numbers.

Each of the "n" pcs. of address files comprises (2-1) the corresponded each selection list identification number, (2-2) One or more addresses of the information stored outside, the addresses correspond to the selection list identification numbers.

When one of the above information recorded media is loaded into an information processing apparatus, the user can obtain the same performance as the user did from the information processing apparatus described above and also the user can get the same performance gotten from the method described above.

EXEMPLARY EMBODIMENT

Exemplary embodiments are explained here by using drawings. In the following embodiments, a disc represents an information recording medium, a home page on the Internet represents the information stored outside, and an address on the Internet (Uniform Resource Locator is used some time, and the abbreviation URL is also used) represents an address of outside information.

A video CD (hereinafter called a disc) is used as an information recording medium. In this disc, image information includes moving and still images, and audio information which are recorded arbitrarily, and which a user can select at his/her choice. The exemplary embodiments handle image information in order to make an explanation simple, and show how to reproduce or select the stored image information using the selection lists.

Exemplary Embodiment 1

Figure 1:
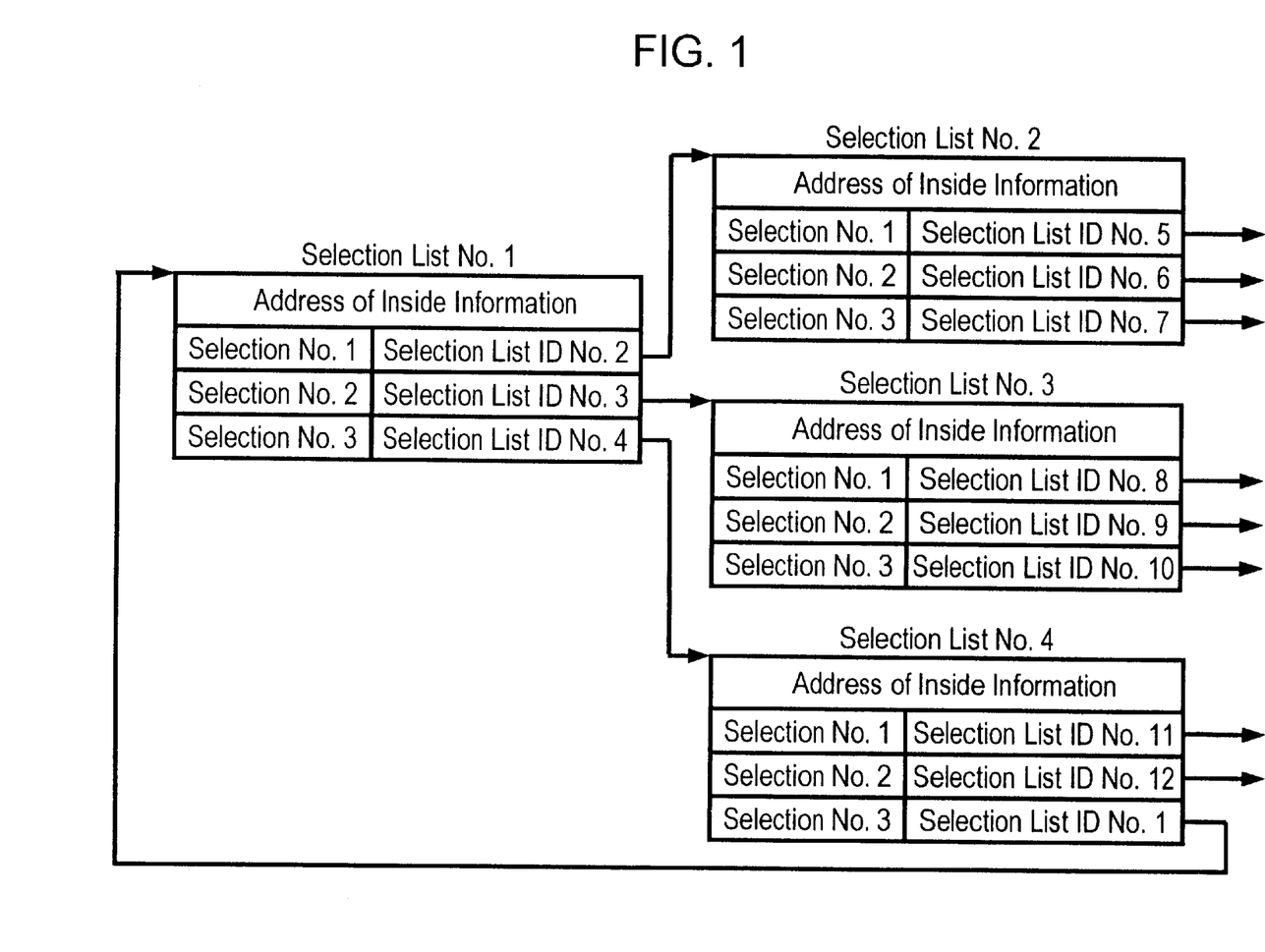
FIG. 1 is a chart depicting the relationship between the selection lists which are recorded in the information recording medium according to the exemplary embodiment 1 of the present invention.

FIG. 1 is a chart depicting the relation between plural selection lists recorded on a disc as an information recording medium (not shown). In FIG. 1, selection lists numbered 1 thorough 4 have addresses of information to be displayed as address of inside information of image information stored on the disc, in order, to display an image including selection numbers, the image to be displayed corresponds to the selection numbers 1 through 3 listed in FIG. 1. A display device is not shown in FIG. 1. Further, the selection lists have plural selection numbers and selection list identification (ID) numbers corresponding to the selection numbers. The selection list having the above structure allows a user to make selection in a tree or loop structure system shown in FIG. 1.

Figure 2:
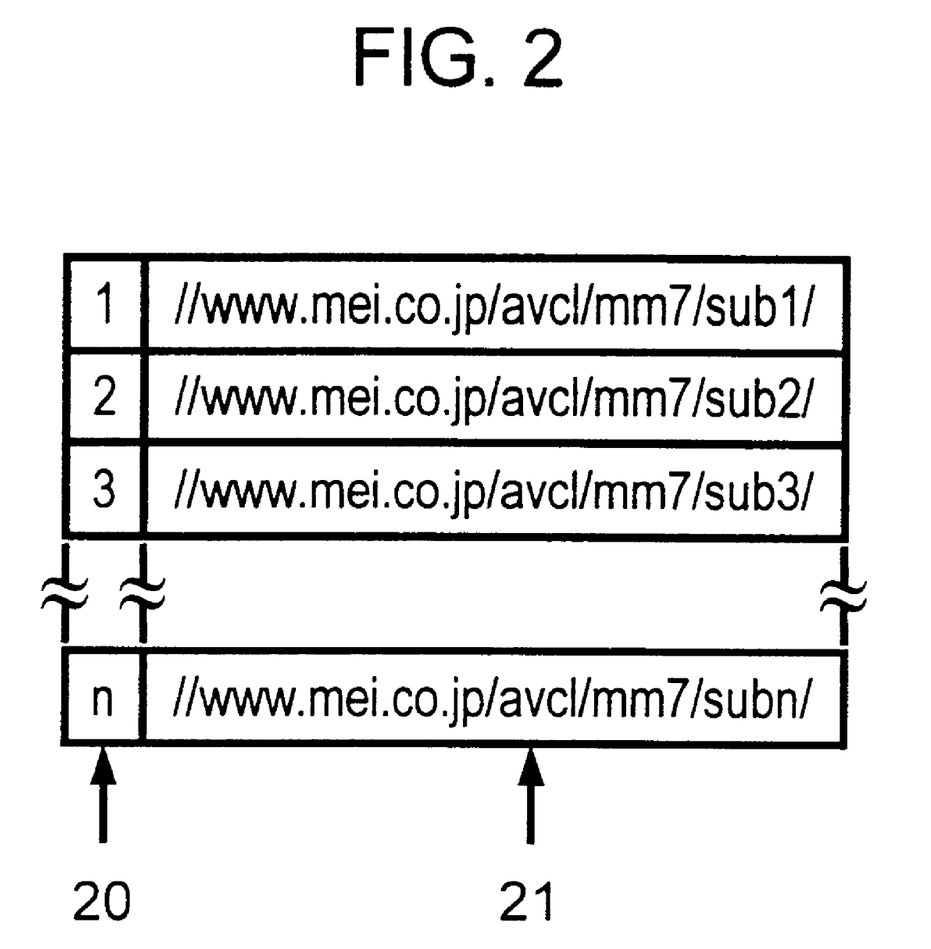
FIG. 2 is a chart depicting an address list of outside information.

FIG. 2 is a chart depicting an address list recorded in the disc, the address list contains the address of information stored outside. In FIG. 2, the list is a URL (Uniform Resource Locator) list listing addresses on the Internet. Code 20 represents a field where the selection list ID number is listed, Code 21 represents a field where actual URL letters are shown as addresses of information stored outside.

During a regular playback operation, selections are looped within the disc; however, when a user requests outside information, the URL list shown in FIG. 2 is retrieved from the now used selection list identification number, and a corresponding URL is found. For example, when the image information corresponding to the selection list 2 in FIG. 1 is played back, the user requests to select outside information. Let's assume the user clicks a button of a display device, the button is assigned to select outside information, since the image information corresponding to the selection list ID number 2 is now played back, a row of letters //www.mei.co.jp/avcl/mm7/sub2/ is found as an address of outside information, thus, the user successfully finds where the outside information is located.

Figure 3:
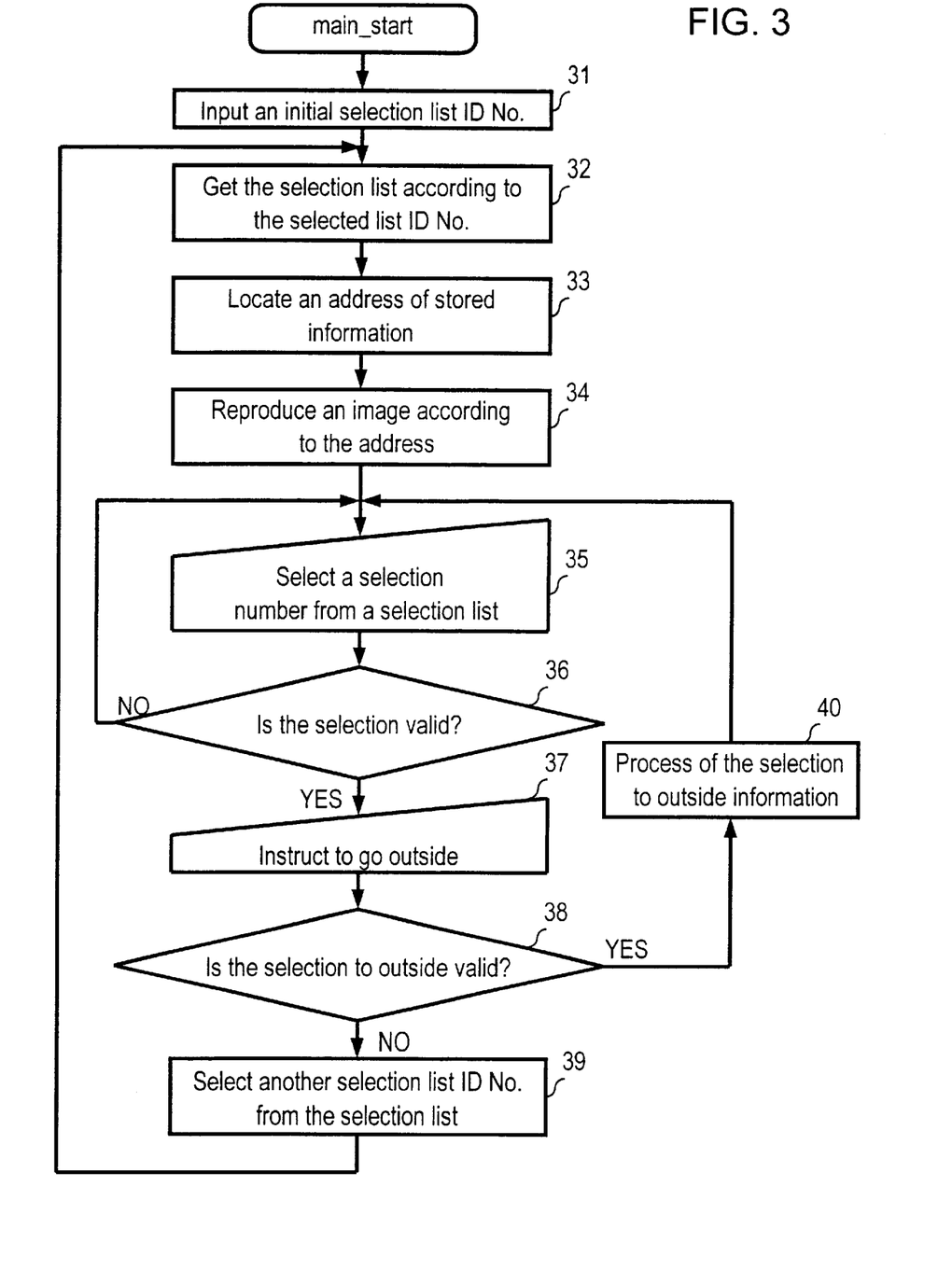
FIG. 3 is a flow chart depicting a looped process within a disc and a process for selecting outside information.
Figure 4:
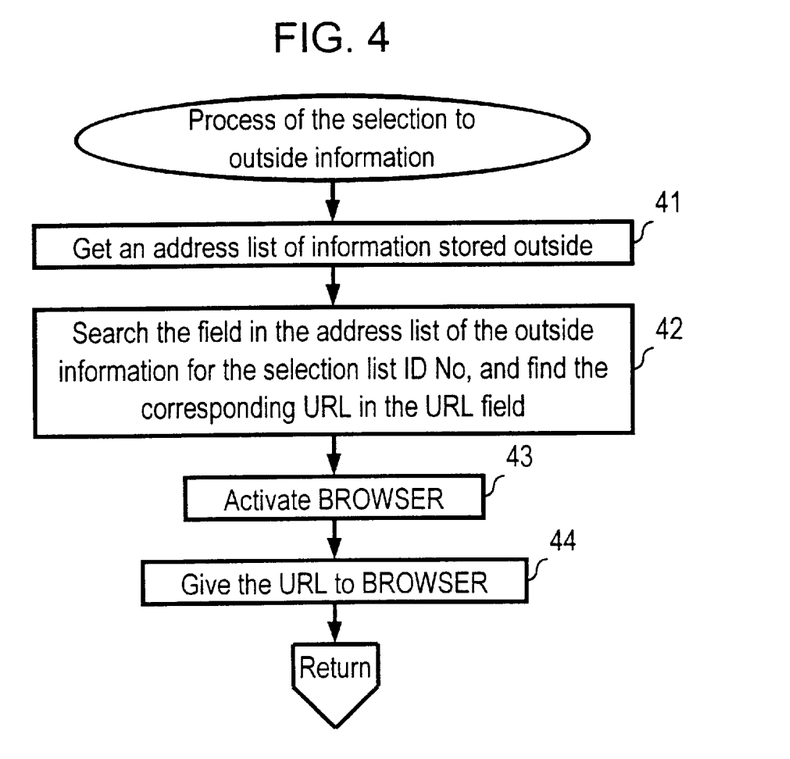
FIG. 4 is a flow chart detailing the process of the selection of outside information shown in FIG. 3.
Figure 5:
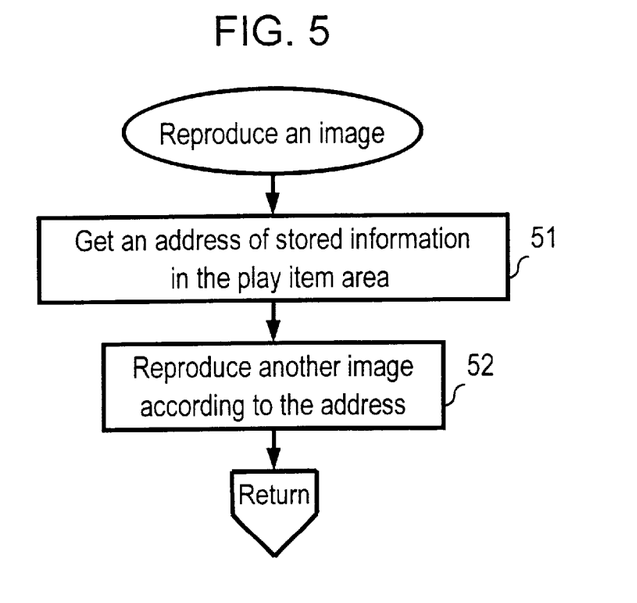
FIG. 5 is a flow chart detailing the process of reproducing an image in the disc.

The above embodiments are now explained using the flow charts as follows: FIG. 3 is a flow chart depicting a looped process in a disc and a process of the selection to outside information. FIG. 4 is a flow chart detailing the process of the selection to outside information shown in FIG. 3. FIG. 5 is a flow chart detailing the process of reproducing an image stored inside the disc.

When a process starts in FIG. 3, an initial selection list ID number is entered on Step 31. In the case of FIG. 1, Selection list ID number 1 is the starting point for all the selection lists, thus the initial value is to be 1. Based on the initial value 1, get the selection list 1 at Step 32, then at Step 33, locate an address of inside information as an address of image information to be displayed that is recorded on the disc. The image recorded on the disc is played back based on this address on Step 34.

At Step 35, the user gives a selecting instruction by clicking a selection number, or input through a keyboard. At Step 36, this selecting instruction is checked to determine if it is valid or not. When the instruction is invalid, return to Step 35, and move on to Step 37 when valid. At Step 37, select outside information, if necessary. At Step 38, check if a selection to outside is valid or not. When no valid selection to outside is found, a selection is deemed to be an inside selection at Step 39, and then select another selection list ID number based on the selected number at Step 35 and return to Step 32 in order to playback an image recorded on the disc. At Step 38, when the selection to outside is judged that a process to outside is required, the process to outside is given at Step 40, and then return to Step 35.

The details of Step 40 is shown in FIG. 4. At Step 41, get the address list of outside information of FIG. 2, and search the field in the list for the selection list ID number, and find the corresponding URL. When plural URLs are listed, select the one based on the selected number at Step 35. Then, activate BROWSER on Step 43, and give the URL to BROWSER and end the subroutine, finally return to Step 35 of FIG. 3.

FIG. 5 details Step 34 of FIG. 3 in reproducing image information recorded on the disc. At Step 51, get the image information of the address of inside information selected in the play item area of the disc, and display the image on Step 52 to end the subroutine before going back to Step 35 of FIG. 3.

As explained above, providing each selection list with an address list of outside information allows a user to select arbitrarily outside information relevant to the image information recorded in the disc. In this embodiment, a URL is used as an address of the information stored outside of the disc.

In this exemplary embodiment, the address list of outside information is described that each selection list has one URL; however, plural URLs as addresses of outside information can be assigned to each selection number. As a result, when selecting outside information, a user can give an instruction of selecting a URL instead of selecting a selection list, thereby allowing the user to make a finer selection.

Exemplary Embodiment 2

Figure 6:
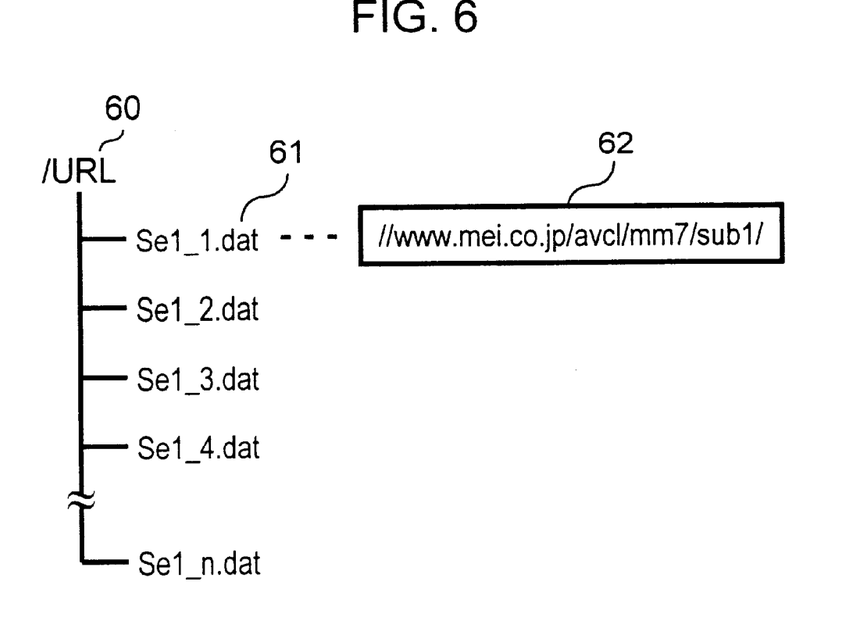
FIG. 6 is a chart depicting an address file of outside information, and the address file is recorded in the medium according to Exemplary Embodiment 2 of the present invention.

FIG. 6 is a chart depicting address files of information stored outside of the disc. The address files are recorded in the disc. FIG. 6 shows a file structure in which each address of outside information is stored in each individual file. For example, the disc has a directory 60 named URL/, and files named Sel_1.dat through Sel_n.dat belong to this directory 60.

Code 61 in FIG. 6 represents the file Sel_1.dat corresponding to the selection list 1, and Code 62 represents the content of the file Sel_1.dat. As this, each file records one URL. A file name is specified to correspond to a selection list ID number, so that an apparatus can retrieve a file corresponding to the selection list ID number when the user selects outside information, and then get a URL according to the content of the file.

For example, "n" pcs of selection lists are available and they have their own number "1" through "n". When the selection list 1 (Selection list ID number 1) is played back, a user selects outside information. At this time, the file Sel_1.dat corresponding to the selection list ID number 1 is retrieved and the address of information stored outside of the disc is displayed as "//www.mei.co.jp/avcl.mm7/sub1/".

As explained above, providing each selection list with an address file of outside information allows a user to select arbitrarily outside information relevant to the image information recorded in the disc. In this embodiment, a URL is used as an address of the information stored outside of the disc.

Figure 7:
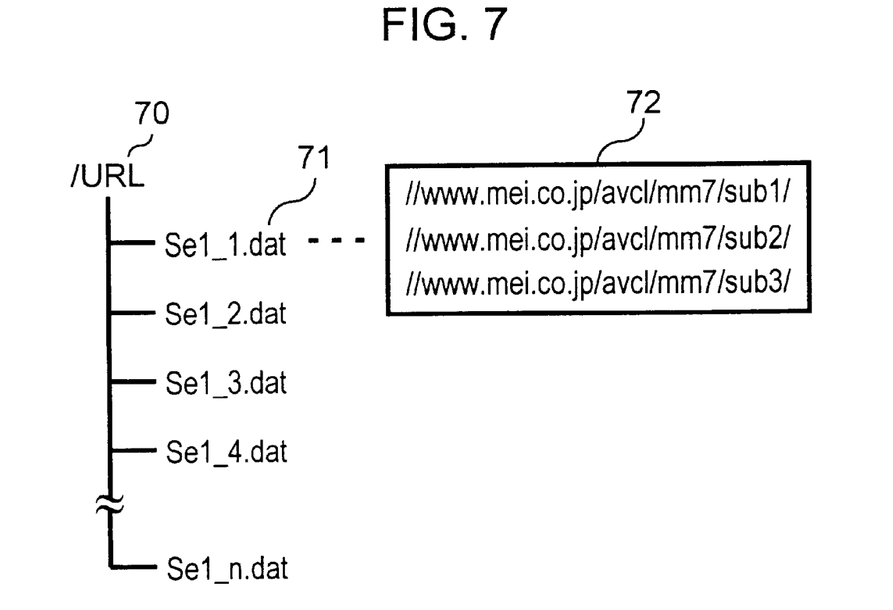
FIG. 7 illustrates another concept of the address file of outside information.

FIG. 7 depicts an example where an address file of Exemplary Embodiment 2 has plural addresses. URL's directory 70 in the disc has an address file 71 named Sel_1.dat, the file corresponds to the selection list ID number 1. In the file coded71, as Code 72 represents, three URLs are stored as addresses of information stored outside of the disc. As this, plural URLs are recorded responsive to the number of selection items in a selection list so that a user can give an instruction of selecting a URL instead of selecting a selection list, thus a user can make a finer selection.

The number of selection lists or selection numbers used in the above exemplary embodiments are only examples, and some selection list may have only one selection number. The hierarchic selection used in the above embodiments is also an example. The first selection list of Selection list ID number 1 may have only one step thereunder, and each selection list may have a different number of selection numbers. Every step under the first selection list may have a selection number which returns to the first selection list. As such, there may be various combinations.

Display information recorded in the medium corresponding to a selection list is not limited to the selected items shown in the exemplary embodiments, it may include a moving image and audio information in addition to the selected item.

Further, the exemplary embodiments cited an access to Internet; however, the user naturally can access not only to Internet but to peripherals coupled to this information processing apparatus, which can realize the following application: Record the data about the operation of an outside audio & video apparatus into the medium, and also record the information how to communicate with the audio & video apparatus into an address list or address file of information, then when a user select the audio & video apparatus, the information processing apparatus communicates with the audio & video apparatus, thus the user can operate the audio & video apparatus according to its special performance or setting condition based on the data recorded in the medium.

Regarding the medium, the medium is not limited to a disc, but it may be a magnetic recording medium, or a memory, etc. It is also not limited to a playback only medium, but it may be a recording or a write-once type.

As explained above, when the information processing apparatus, information process method, or information recorded medium which records the same method, of the present invention is used, since an address list or file of information stored outside of the medium is available in the medium, a user can retrieve the address list or file from the now used selection list during a regular playback operation of image information stored in the medium, and can reach to an address of outside information. This selection does not require to change the structure or contents of the conventional selection list.

What is claimed is:

1. An information processing apparatus comprising:
   (a) inside image information,
   (b) playback means for playing back said inside image information,
   (c) a plurality of selection lists each having proper numbers, each selection list including:
      (1) an address of said inside image information,
      (2) one or more selection numbers, and
      (3) a selection list identification number corresponding to one of said selection numbers,
   (d) an address list of outside information, said address list of outside information including;
      (1) each proper number of said plurality of selection lists and,
      (2) one or more addresses of outside information corresponding to each proper number.

2. An information processing apparatus comprising:
   (a) inside image information,
   (b) playback means for playing back said inside image information,
   (c) a plurality of selection lists each having proper numbers, each selection list including;
      (1) an address of said inside image information,
      (2) one or more selection numbers, and
      (3) a selection list identification number corresponding to said selection numbers,
   (d) a plurality of address files of information stored outside said information processing apparatus, each address file including;
      (1) a file name corresponding to said selection list identification numbers,
      (2) one or more addresses of outside information corresponding to said selection list identification numbers.

3. An information process method using an information recording medium with recorded image information, said information recording medium including;
   (1) a field recorded with a plurality of selection lists having proper numbers, each of said selection lists including;
      (1-1) an address of inside information of said image information,
      (1-2) one or more selection numbers, and
      (1-3) a selection list identification number corresponding to one of said selection numbers,
   (2) a field recorded with an address list of information stored outside of said information recording medium, said address list includes;
      (2-1) a plurality of said selection list identification numbers,
      (2-2) one or more addresses of outside information corresponding to said selection list identification numbers, said information process method comprising the steps of:
   (a) obtaining a first selection list based on an initial selection list identification number,
   (b) playing back an image based on an address of inside information of image information recorded in said first selection list,
   (c) selecting a selection number based on an instruction of a first image,
   (d) selecting outside information, and
   (e) playing back a further image based on the address of inside information of image information recorded in one of said selection lists corresponding to said selection number selected in step c).

4. An information process method using an information recording medium with recorded image information, said information recording medium including;
   (1) a field recorded with a plurality of selection lists having proper numbers, each of said selection lists including;
      (1-1) an address of inside information of said image information,
      (1-2) one or more selection numbers, and
      (1-3) a selection list identification number corresponding to one of said selection numbers,
   (2) a plurality of address files recorded with information stored outside of said information recording medium, each of said address files including;
      (2-1) a plurality of said selection list identification numbers,
      (2-2) one or more addresses of outside information corresponding to said selection list identification numbers,
said information process method comprising the steps of:
   (a) obtaining a first selection list based on an initial value of a selection list identification number,
   (b) playing back an image based on an address of inside image information recorded in said first selection list,
   (c) selecting a selection number based on an instruction of a first image,
   (d) selecting outside-information upon request, and
   (e) playing back a further image based on the address of inside information of image information recorded in one of said selection lists corresponding to said selection number selected in step c).

5. An information recording medium in which image information is recorded comprising:
   (a) a field recorded with a plurality of selection lists having proper numbers, each of said selection lists including;
      (1) an address of inside information of said image information,
      (2) one or more selection numbers, and
      (3) a selection list identification number corresponding to one of said selection numbers,
   (b) a field recorded with an address list of information stored outside of said information recording medium, said list including;
      (1) a plurality of said selection list identification numbers,
      (2) one or more addresses of outside information corresponding to each said selection list identification number.

6. An information recording medium in which image information is recorded comprising:
(a) a field recorded with a plurality of selection lists having proper numbers, each of said selection lists including;
   (1) an address of inside information of said image information,
   (2) one or more selection numbers, and
   (3) a selection list identification number corresponding to one of said selection numbers,
(b) a plurality of address files of information stored outside of said information recording medium, each of said address files including;
   (1) a plurality of said selection list identification numbers,
   (2) one or more addresses of outside information corresponding to said selection list identification numbers.

* * * * *